United States Patent
Matsumoto (10) Patent No.: US 7,324,411 B2
(45) Date of Patent: Jan. 29, 2008

(54) THIN-FILM COIL, COIL DRIVING CIRCUIT AND MAGNETIC HEAD

(75) Inventor: Tsuyoshi Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 586 days.

(21) Appl. No.: 11/006,994

(22) Filed: Dec. 8, 2004

(65) Prior Publication Data

US 2006/0072385 A1    Apr. 6, 2006

(30) Foreign Application Priority Data

Sep. 17, 2004   (JP) .............................. 2004-272190

(51) Int. Cl.
   *G11B 11/00* (2006.01)
(52) U.S. Cl. ................. 369/13.23; 369/44.14
(58) Field of Classification Search ............ 369/13.23, 369/13.01, 13.13, 112.25, 13.33, 44.22, 44.14; 360/317, 322, 126, 324.2; 720/671
   See application file for complete search history.

(56) References Cited

U.S. PATENT DOCUMENTS 6,654,203 B2 * 11/2003 Yari et al. .................. 360/126
6,704,249 B2    3/2004 Yoshikawa et al. ....... 369/13.23
6,822,830 B2 * 11/2004 Mino et al. ................. 360/126
6,977,870 B2 * 12/2005 Fujimaki et al. .......... 369/13.13
7,127,729 B2 * 10/2006 Kawasaki et al. .......... 720/671

FOREIGN PATENT DOCUMENTS

| JP | 11-259813 | 9/1999 |
|---|---|---|
| JP | 2001-185419 | 7/2001 |
| JP | 2003-51144 | 2/2003 |
| JP | 2003-282324 | 10/2003 |
| JP | 2004-280874 | 10/2004 |

* cited by examiner

*Primary Examiner*—Ali Neyzari
(74) *Attorney, Agent, or Firm*—Greer, Burns & Crain, Ltd.

(57) ABSTRACT

A thin-film coil include a substrate and first and second spiral coils of bifilar winding. Each of the first and the second coils includes an outer circumferential end and an inner circumferential end. The outer circumferential ends of the first and the second spiral coils are insulated from each other and individually extended to a side of the substrate. The inner circumferential ends of the first and the second spiral coils are connected to each other and extended to a side of the substrate.

12 Claims, 11 Drawing Sheets

THIN-FILM COIL, COIL DRIVING CIRCUIT AND MAGNETIC HEAD

BACKGROUND OF THE INVENTION

1. Field of the Invention

The present invention relates to thin-film coils, coil driving circuits and magnetic heads which are used for recording data in a magnetic recording medium.

2. Description of the Related Art

Recording of data on magnetic recording media is performed by controlling the direction of the magnetic flux of a recording magnetic field generated by a thin-film coil provided in a magnetic head. The direction of magnetic flux of the recording magnetic field with respect to the magnetic recording medium is alternated rapidly and continuously by driving the thin-film coil. In applying the recording magnetic field to the recording medium, the alternation of the direction of the magnetic flux should be made as quickly as possible. For this reason, the magnetic head is provided with a spiral coil which has a two-layer structure (See JP-A-2003-51144 for example).

Figure 13:
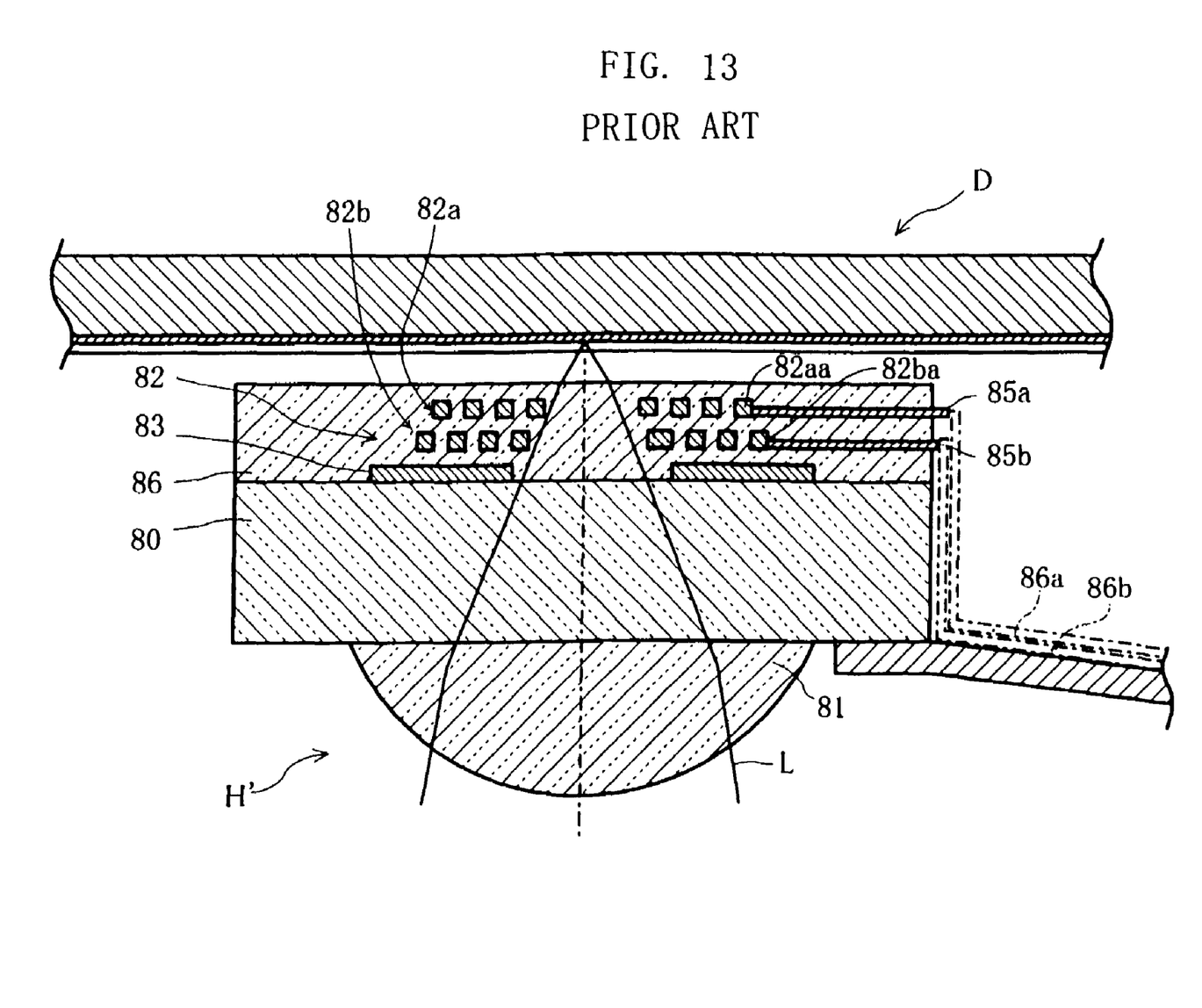
FIG. 13 is a diagram showing a conventional art.

Conventionally, the magnetic head for recording data in such away as the above has, for example, the construction shown in FIG. 13. A magnetic head H' includes a transparent substrate 80, an object lens 81 attached to the transparent substrate 80, a thin-film coil 82 and a magnetic film 83. The thin-film coil 82 generates a recording magnetic field, and includes spiral coils 82a, 82b which are formed in two layers. These spiral coils 82a, 82b are coated with a dielectric layer 86 for insulation. In each layers of the spiral coils 82a, 82b, their respective outer circumferential ends 82aa, 82ba are insulated from each other and are connected to lead wires 85a, 85b respectively, which extend radially of the thin-film coil 82. Further, these lead wires 85a, 85b are connected to wiring members 86a, 86b which extend out of the transparent substrate 80. Though not illustrated in FIG. 13, each of the spiral coils 82a, 82b in the respective layers has an inner circumferential end which is connected to a common terminal that provides a predetermined reference potential. In these spiral coils 82a, 82b, wires are wound in the opposite directions to each other. The magnetic film 83 is provided by a material which has a high magnetic permeability, and is formed below the thin-film coil 82.

Figure 14:
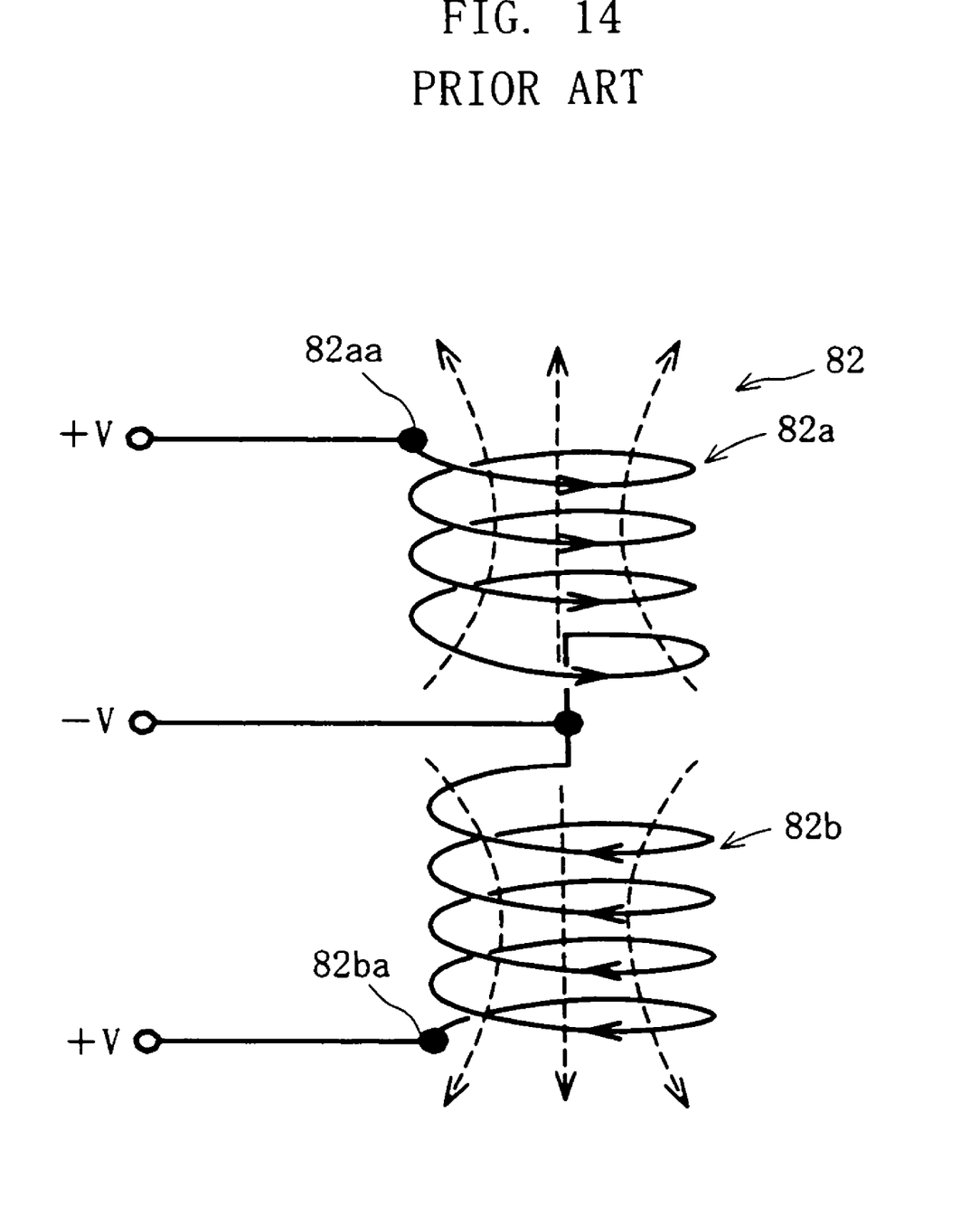
FIG. 14 is a diagram for describing electromagnetic operation in the conventional art.

According to such a construction, an electromagnetic operation as shown in FIG. 14 for example is achieved. Specifically, with the reference potential at the common terminal being −V, one spiral coil 82a generates a magnetic field which has an upwardly-oriented magnetic flux when a voltage +V is applied to the outer circumferential terminal 82aa. On the other hand, the other spiral coil 82b generates a magnetic field which has a reverse or downwardly-oriented magnetic flux when the same voltage +V is applied to the outer circumferential terminal 82ba. In other words, the coil driving circuit for driving the thin-film coil 82 switches the states of energization of the spiral coils 82a, 82b exclusively to each other and at a high speed, based on a high-frequency signal which represents data to be recorded. In this manner, the recording magnetic field works on a magnetic recording medium D while the direction of magnetic flux is alternated at high speed, and data is recorded upon formation of magnetic domains which are given a polarity corresponding to the direction of the magnetic flux.

However, according the conventional technique described above, one spiral coil 82a is in a layer which is closer to the magnetic recording medium D while the other spiral coil 82b is in a layer which is farther, sandwiching the spiral coil 82a. With this construction, if the number of windings and the size of the coil are the same in both of the spiral coils 82a, 82b, the recording magnetic field generated by the spiral coil 82b which is in the layer farther from the magnetic medium D tends to be weaker than the recording magnetic field generated by the spiral coil 82a which is in the layer closer to the medium, which results in instability in the intensity of the recording magnetic field.

As a solution to such a problem, the number of windings and the size of the spiral coils 82a, 82b in respective layers could be different from each other, thereby stabilizing the intensity of the recording magnetic field. This is not preferable, however, because the spiral coils 82a, 82b then have different inductance values from each other, generating recording magnetic fields whose waveforms are different from each other depending upon whether the magnetic flux is pointing upward or downward. Even if the spiral coils 82a, 82b are constructed so as to have the same inductance, there is still a need for adjusting electric current values in the coil driving circuit when each of the spiral coils 82a, 82b are energized, which results in another problem of complex construction of the coil driving circuit.

SUMMARY OF THE INVENTION

The present invention has been proposed under the circumstances described above, and it is therefore an object of the present invention to provide a thin-film coil, a coil driving circuit and a magnetic head capable of stably generating the recording magnetic field, without complexity in physical or electrical construction.

In order to solve the problems, the present invention adopts the following technical means.

According to a first aspect of the present invention, there is provided a thin-film coil comprising a first and a second spiral coils of bifilar winding formed in a predetermined layer on a substrate, each of the first and the second spiral coils including an outer circumferential end and an inner circumferential end. The outer circumferential end of the first spiral coil and the outer circumferential end of the second spiral coil are insulated from each other and extended individually to a side of the substrate. The inner circumferential end of the first spiral coil and the inner circumferential end of the second spiral coil are connected to each other and extended to a side of the substrate via a layer different from the predetermined layer.

According to a second aspect of the present invention, there is provided a thin-film coil comprising a first and a second spiral coils of bifilar winding formed in a predetermined layer on a substrate, each of the first and the second spiral coils including an outer circumferential end and an inner circumferential end. The outer circumferential end of the first spiral coil and the outer circumferential end of the second spiral coil are connected to each other and extended to a side of the substrate. The inner circumferential end of the first spiral coil and the inner circumferential end of the second spiral coil are insulated from each other and extended individually to a side of the substrate via a layer different from the predetermined layer.

According to a third aspect of the present invention, there is provided a thin-film coil comprising a first and a second layers on a substrate, each of the first and the second layers comprising a first and a second spiral coils of bifilar winding, each of the first and the second spiral coils in each layer including an outer circumferential end and an inner circumferential end. A coil winding direction of the first and the second spiral coils in the first layer and a coil winding direction of the first and the second spiral coils in the second layer are identical to each other. The outer circumferential end of selected one of the first and the second spiral coils in the first layer are connected to the outer circumferential end of selected one of the first and the second spiral coils in the second layer, while the outer circumferential end of nonselected one of the first and the second spiral coils in the first layer are connected to the outer circumferential end of nonselected one of the first and the second spiral coils in the second layer, each of the connected pairs of the outer circumferential ends being individually extended to a side of the substrate. The inner circumferential ends of the first and the second spiral coils in the first layer are connected to each other and collectively connected to the inner circumferential ends of the first and the second spiral coils in the second layer. The inner circumferential ends of the spiral coils in the first layer and the second layer thus integrated by the collective connection are extended to a side of the substrate via a layer different from the first and the second layers.

According to a fourth aspect of the present invention, there is provided a thin-film coil comprising a first and a second layers on a substrate, each of the first and the second layers comprising a first and a second spiral coils of bifilar winding, each of the first and the second spiral coils in each layer including an outer circumferential end and an inner circumferential end. A coil winding direction of the first and the second spiral coils in the first layer and a coil winding direction of the first and the second spiral coils in the second layer are opposite to each other. The outer circumferential end of selected one of the first and the second spiral coils in the first layer are connected to the outer circumferential end of selected one of the first and the second spiral coils in the second layer. The outer circumferential ends of the spiral coils in the first layer and the second layer thus formed into a connected pair are extended to a side of the substrate, while the outer circumstantial ends of nonelected spiral coils in the first layer and the second layer are extended individually to a side of the substrate. The inner circumferential end of selected one of the first and the second spiral coils in the first layer are connected to the inner circumferential end of selected one of the first and the second spiral coils in the second layer.

According to a fifth aspect of the present invention, there is provided a coil driving circuit for driving the thin-film coil according to the first aspect. The circuit constantly keeps the inner circumferential end of the first spiral coil and the inner circumferential end of the second spiral coil at a predetermined reference potential. The circuit energizes one of the outer circumferential ends of the first spiral coil and the second spiral coil to a positive electric potential relative to the reference potential, while also energizes the other outer circumferential end to a negative electric potential relative to the reference potential. The circuit is designed to switch these states of energization exclusively to each other.

According to a sixth aspect of the present invention, there is provided a coil driving circuit for driving the thin-film coil according to the second aspect. The circuit constantly keeps the outer circumferential end of the first spiral coil and the outer circumferential end of the second spiral coil at a predetermined reference potential. The circuit energizes one of the inner circumferential ends of the first spiral coil and the second spiral coil to a positive electric potential relative to the reference potential, while also energizes the other inner circumferential end to a negative electric potential relative to the reference potential. The circuit is designed to switch these states of energization exclusively to each other.

According to a sixth aspect of the present invention, there is provided a coil driving circuit for driving the thin-film coil according to the third aspect. The circuit constantly keeps the inner circumferential ends of the first and the second spiral coils in the first layer as well as the inner circumferential ends of the first and the second spiral coils in the second layer at a predetermined reference potential. The circuit energizes one of the connected pairs of the outer circumferential ends of the spiral coils in the first layer and the second layer to a positive electric potential relative to the reference potential, while energizes the other pair to a negative electric potential relative to the reference potential. The circuit is designed to switch these states of energization exclusively to each other.

According to an eighth aspect of the present invention, there is provided a coil driving circuit for driving the thin-film coil according to the forth aspect. The circuit constantly keeps the connected pair of the outer circumferential ends of the spiral coils in the first and the second layers at a predetermined reference potential. The circuit energizes all of the other outer circumferential ends of the spiral coils in the first layer and the second layer to a predetermined level of electric potential relative to the reference potential. The circuit is designed to switch these states of energization exclusively to each other.

According to a ninth aspect of the present invention, there is provided a magnetic head comprising the thin-film coil according to any one of the first aspect through the fourth aspect.

Other characteristics and advantages of the present invention will become clearer from the following description to be made with reference to the drawings.

DETAILED DESCRIPTION OF THE PREFERRED EMBODIMENTS

Preferred embodiments of the present invention will be described below with reference to the drawings.

Figure 1:
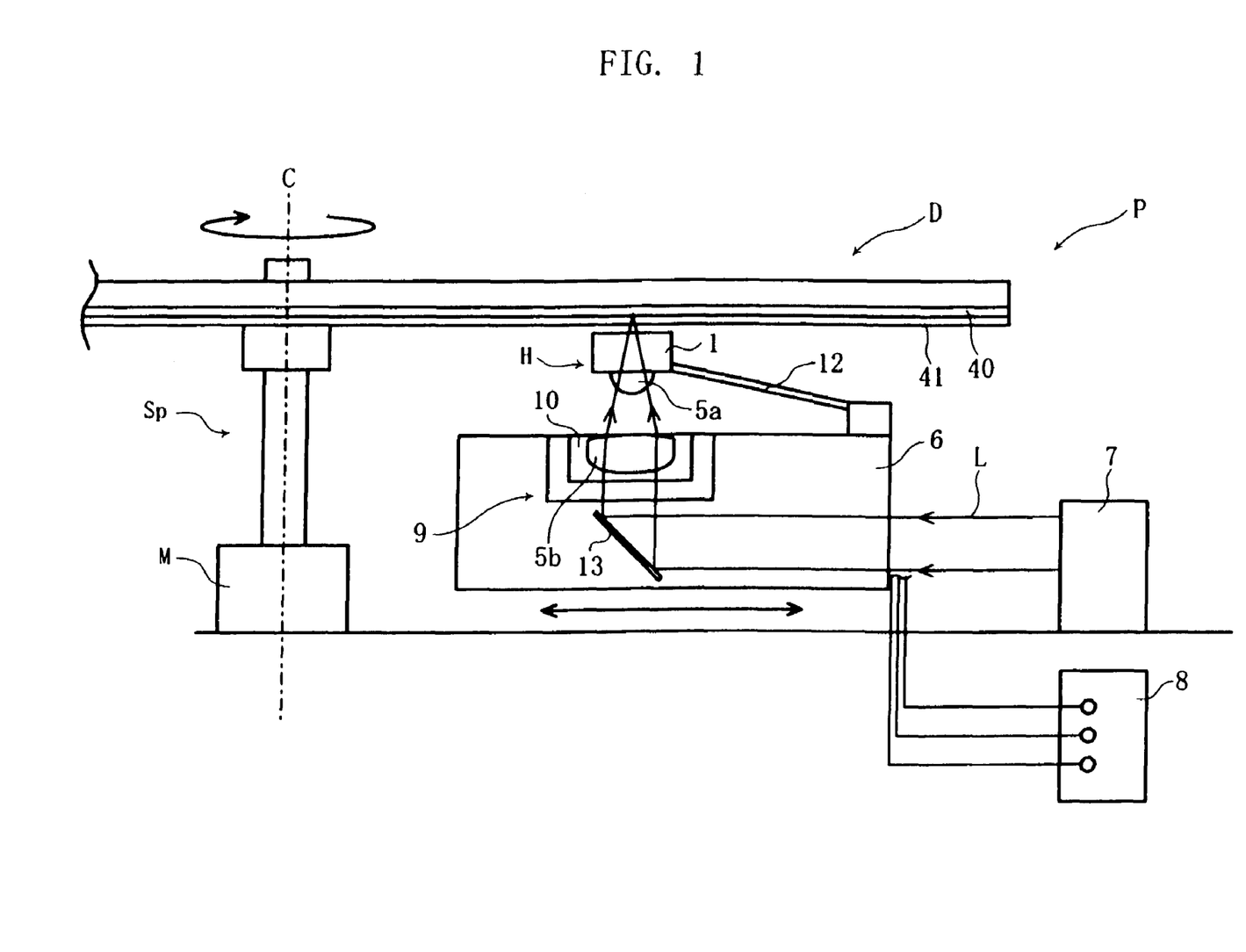
FIG. 1 is a schematic diagram of a magnetic information processing device incorporating a magnetic head provided by the present invention.

FIGS. 1-4 show a first embodiment of the magnetic head according to the present invention. Reference is first made to FIG. 1 illustrating a magnetic information processing device which incorporates the magnetic head according to the present invention. The magnetic information processing device P shown in the figure is a magneto-optical disc drive which includes a magnetic head H, a carriage 6, a fixed optical unit 7 and a power supply unit 8.

A magneto-optical disc D is supported by a spindle Sp, and can be turned around the spindle Sp at a high speed with a driving force provided by a spindle motor M. The magneto-optical disc D has two surfaces. One of the surfaces is to be faced by the magnetic head H and provided with a recording layer 40. The surface of the recording layer 40 is covered with a transparent and insulating protective coating 41.

The carriage 6 is below the magneto-optical disc D, and is movable radially of the magneto-optical disc D with a driving force from an unillustrated voice coil motor for example. This movement of the carriage 6 provides seek operation for bringing the magneto-optical head H close to the target track. The fixed optical unit 7 includes a laser diode, a collimator lens and so on (none of which are illustrated). A laser beam L generated at the fixed optical unit 7 travels towards the carriage 6, to a mirror 13 mounted on the carriage 6. The optical unit 7 also includes a beam splitter and a light detector (none of which are illustrated).

An actuator 9 provides focus control and tracking control during recording and replaying operations of the magneto-optical disc D. The actuator 9 is mounted on the carriage 6 and moves a lens holder 10 which holds an object lens 5b in vertical and radial directions of the magneto-optical disc D.

Figure 2:
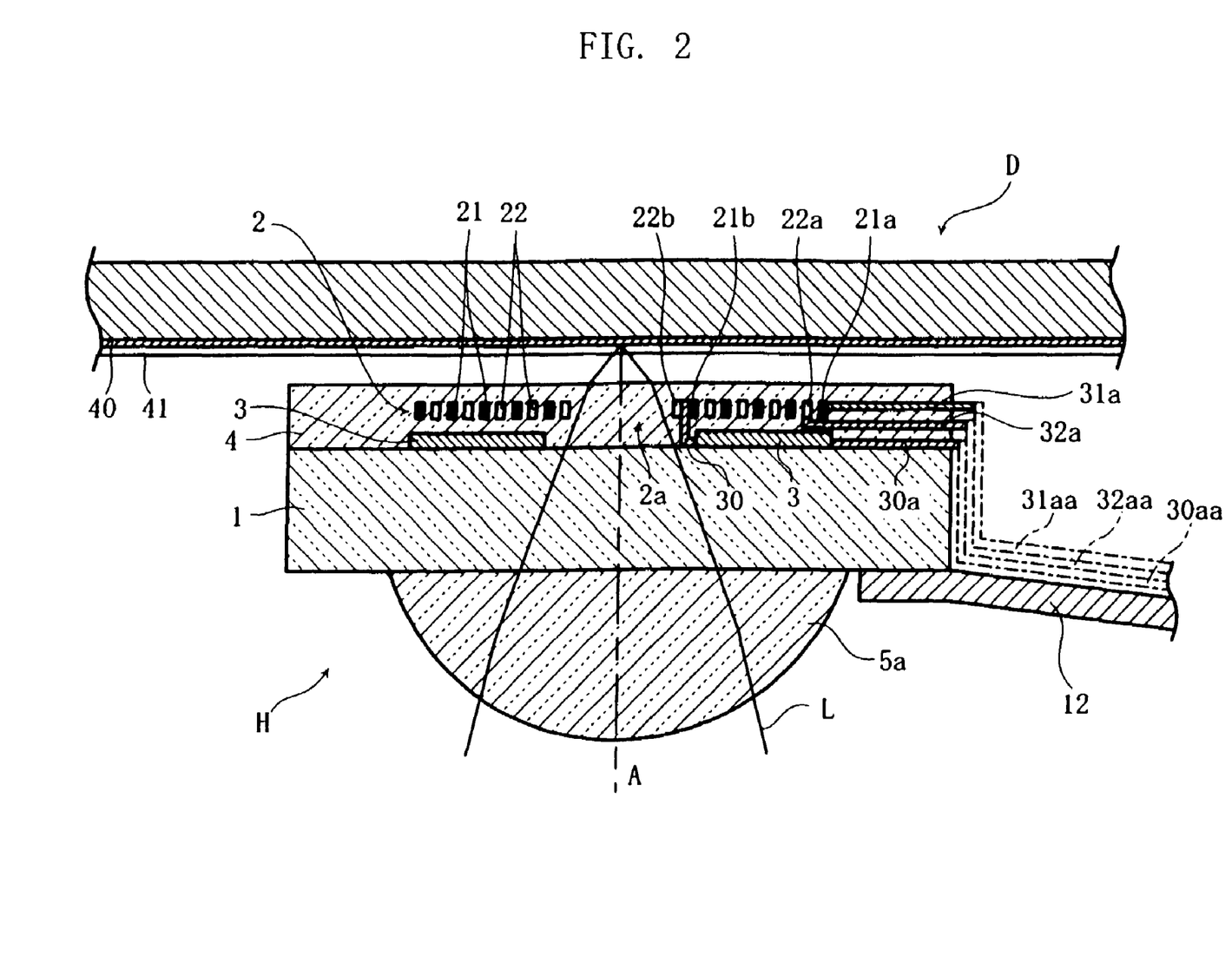
FIG. 2 is a sectional view showing a primary portion of a magnetic head as a first embodiment of the present invention.

As shown clearly in FIG. 2, the magnetic head H is constructed as a magneto-optical head which includes a transparent substrate 1, an object lens 5a attached to the substrate 1, a thin-film coil 2 and a magnetic film 3. The substrate 1 is supported by a suspension 12, which is deflectable in vertical directions, and is faced to the magneto-optical disc D. The substrate 1 floats above the magneto-optical disc D, making a small gap in between, due to so called wedge effect created by an air flow that flows between the substrate and the magneto-optical disc D. The substrate 1 as described as the above is made of glass which, for example, has the same property as glass of which the object lens 5a is made, and the surface of the substrate is formed with a transparent dielectric layer 4.

The object lens 5a focuses the laser beam L after the beam passes through the object lens 5b, and forms a laser spot on a recording area (magnetic domain) in the recording layer 40 of the magneto-optical disc D.

The thin-film coil 2 is formed in an imaginary thin slice region ('sub-layer' or simply 'layer') contained in the dielectric layer 4 (which can be considered as a stack of 'sub-layers' in light of the method of making the layer 4 to be described later). The coil 2 comprises a first spiral coil 21 and a second spiral coil 22. The first and the second spiral coils 21-22, insulated from each other by the dielectric layer 4, are produced in accordance with the so-called bifilar winding. As seen from FIG. 3, both coils 21 and 22 are wound in the same direction. The first and the second spiral coils 21, 22 are disposed so as not to block the laser beam L which has passed the object lens 5a and the substrate 1.

The object lens 5a has its optical axis A pass a coil center region 2a. The first and the second spiral coils 21, 22 as described above have the same number of windings and length, and as a result, the two coils have the same inductance. The magnetic film 3 is below the thin-film coil 2, and reduces downward leakage of the recording magnetic field generated by the thin-film coil 2, thereby assisting the magnetic field to work effectively on the magneto-optical disc D. The magnetic film 3 is made of a material which has a high magnetic permeability such as permalloy, and is formed not to block the laser beam L, and to have the optical axis A pass a center region of the film.

Figure 3:
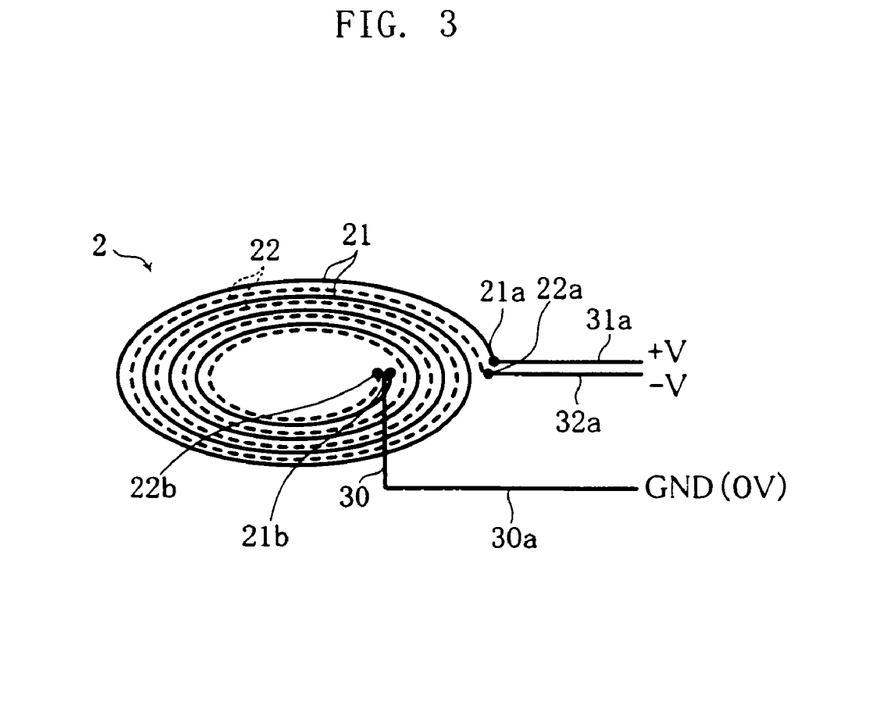
FIG. 3 is a diagram of a thin-film coil in FIG. 2.

The first and the second spiral coils 21, 22 in the thin-film coil 2 have outer circumferential ends 21a, 22a and inner circumferential ends 21b, 22b respectively. The outer circumferential end 21a of the first spiral coil 21 and the outer circumferential end 22a of the second spiral coil 22 are insulated from each other via the dielectric layer 4. These outer circumferential ends 21a, 22a are connected respectively with lead wires 31a, 32a which extend radially of the thin-film coil 2. The lead wires 31a, 32a are respectively connected to wiring members 31aa, 32aa which extend outwardly of the substrate 1. These wiring members 31aa, 32aa lead to the coil driving circuit which is out of the scope of the figure. On the other hand, the inner circumferential end 21b of the first spiral coils 21 and the inner circumferential end 22b of the second spiral coil 22 are connected to each other via an electrically conductive junction 30. The junction 30 is connected to a lead wire 30a which extend radially of the thin-film coil 2. The lead wire 30a connected to the junction 30 leads to a wiring member 30aa which extends out of the substrate 1, and the wiring member 30aa leads to the coil driving circuit which is out of the scope of the figure. The lead wire 30a connected to the junction 30 may be formed separately from the magnetic film 3 or may be integral with the magnetic film 3. However, the other lead wires 31a, 32a are always formed separately from the magnetic film 3.

As shown in FIG. 3, the inner circumferential end 21b of the first spiral coil 21 and the inner circumferential end 21b of the second spiral coil 22 are commonly connected, via the junction 30, the lead wire 30a and so on, to a grounding terminal which has a reference potential of 0V. On the other hand, the outer circumferential end 21a of the first spiral coil 21 is supplied with a +V electric potential from the unillustrated coil driving circuit via the lead wire 31a and so on, so that there is a positive potential difference from the reference potential 0V. Also, the outer circumferential end 22a of the second spiral coil 22 is supplied with a −V electric potential from the unillustrated coil driving circuit via the lead wire 32a and so on, so that there is a negative potential difference from the reference potential 0V, with the absolute voltage vale being the same as of the voltage of the above +V. With this arrangement, in the present embodiment, the first spiral coil 21 generates a recording magnetic field which has an upward magnetic flux from the coil center region 2a toward the disc D, when energized with the +V voltage applied to the outer circumferential end 21a. On the contrary, the second spiral coil 22 generates a recording magnetic field which has a reverse magnetic flux direction as of the upward flux created by the first spiral coil 21, i.e. a downward magnetic flux from the coil center region 2a toward the substrate 1, when energized with the −V voltage applied to the outer circumferential end 22a. It should be noted here that the outer circumferential end 21a of the first spiral coil 21 may be supplied with the −V voltage while the outer circumferential end 22a of the second spiral coil 22 is supplied with the +V voltage. In this case, directions of the magnetic fluxes of the recording magnetic fields generated by the first and the second spiral coils 21, 22 are the opposite directions to those described above.

Figure 4:
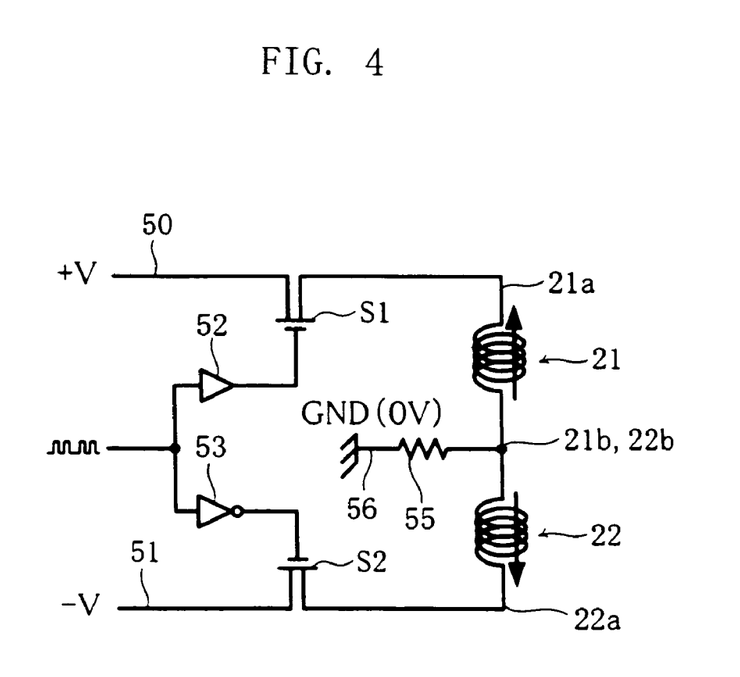
FIG. 4 shows an equivalent circuit to a coil driving circuit for the thin-film coil in FIG. 2.

The coil driving circuit for driving the thin-film coil 2 has a construction as exemplified in FIG. 4. As shown in FIG. 4, in the coil driving circuit, the outer circumferential end 21a of the first spiral coil 21 is connected to a power input terminal 50 of the +V via a switching transistor S1 while the outer circumferential end 22a of the second spiral coil 22 is connected to a power input terminal 51 of the −V via a switching transistor S2. The inner circumferential ends 21b, 22b of the first and the second spiral coils 21, 22 are commonly connected to a grounding terminal 56 of the reference potential 0V, via an electric resister 55. The switching transistor S1 is supplied with a digital signal which represents data to be recorded, via an amplifying device 52 which outputs signals of the same phase as of the input. Responding to the H/L levels of the digital signal, the switching transistor S1 is turned on and off. On the other hand, the switching transistor S2 is supplied with a digital signal which represents the data to be recorded, via a reverse amplifying device 53 which outputs signals of the reversed phase as the input. Responding to the H/L levels of this digital signal, the switching transistor S2 is turned on and off. In other words, the coil driving circuit switches the state of energization of the first and the second spiral coils 21, 22 exclusively to each other and at a high speed, based on a digital signal which represents data to be recorded.

The first and the second spiral coils 21, 22, the junction 30, the lead wires 30a-32a, the magnetic film 3 and so on which constitute the thin-film coil 2 as described above can be manufactured through a process similar to the process used in manufacture of semiconductors. The first and the second spiral coils 21, 22, the junction 30, and the lead wires 30a-32a are formed by patterning a film of metal such as copper into a predetermined pattern. After the first and the second spiral coils 21, 22 are formed, these coils are covered with a thin film of dielectric material (above-mentioned 'sub-layer'). Before this, the magnetic film 3 is formed by patterning a film of e.g. permalloy, and then covered with a thin film of dielectric material. In such a manner, the dielectric layer 4 having a laminated structure (made up of several 'sub-layers' or simply 'layers') is formed on the substrate 1, enclosing the first and the second spiral coils 21, 22, the junction 30, the lead wires 30a-32a, the magnetic film 3 and so on.

Next, an operation of the magnetic head H will be described.

When recording data on a disc D using a magnetic field modulation method, the disc D is rotated, whereby the substrate 1 is floated off the disc D at a slight gap from the disc D. Then, by irradiating a recording region of the recording layer 40 with the laser beam L continuously or intermittently at a predetermined frequency, the temperature of the recording layer 40 is increased. On the other hand, the thin-film coil 2 generates a recording magnetic field, whose direction of magnetic flux is alternated by the first and the second spiral coils 21, 22. The first and the second spiral coils 21, 22 are driven by a coil driving circuit which switches the first and the second spiral coils 21, 22 exclusively to each other, whereby the direction of magnetic flux is reversed at a high speed, based on the contents of data to be recorded. This controls the direction of magnetization of the magnetic material in the recording layer 40, forming magnetic domains within the recording layer 40 so magnetized as in the direction, thereby recording the data.

During this, the recording magnetic field generated by the first spiral coil 21 and the recording magnetic field generated by the second spiral coil 22 have the same level of intensity to the disc D even if the direction of magnetic flux is alternated at a high speed. This is because the first and the second spiral coils 21, 22 have identical physical construction including the distance from the disc D, the number of windings and the length, and in addition, the first and the second spiral coils 21, 22 are supplied with an identical level of voltage although the voltage polarity is different. With this arrangement, the magnetic head H is able to generate a recording magnetic field stably while the direction of magnetic flux with respect to the disc D is alternated at a high speed, with a simple physical construction in the thin-film coil 2 as well as a simple electrical construction in the coil driving circuit.

Further, the coil driving circuit is only supposed to perform exclusive switching in the state of energization of the first and the second spiral coils 21, 22, based on the digital signal which represents the recording data. This means that one of the first and the second spiral coils 21, 22 is de-energized when the other is energized. For this reason, the coil driving circuit can drive the thin-film coil 2 appropriately, without using high frequency signals in a relatively high frequency range. This enables to reduce power consumption by the coil driving circuit.

Figure 5:
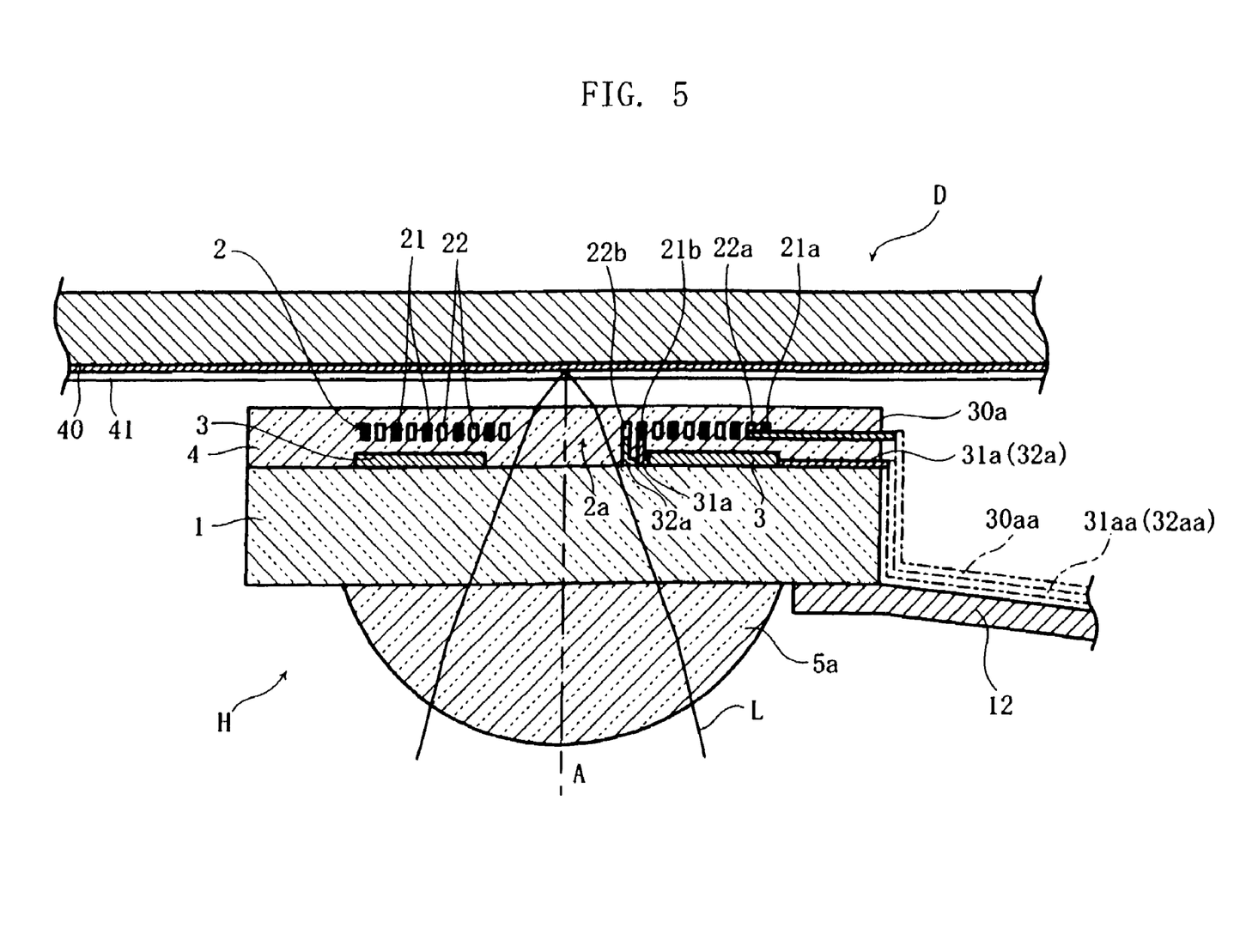
FIG. 5 is a sectional view showing a primary portion of a magnetic head as a second embodiment of the present invention.
Figure 6:
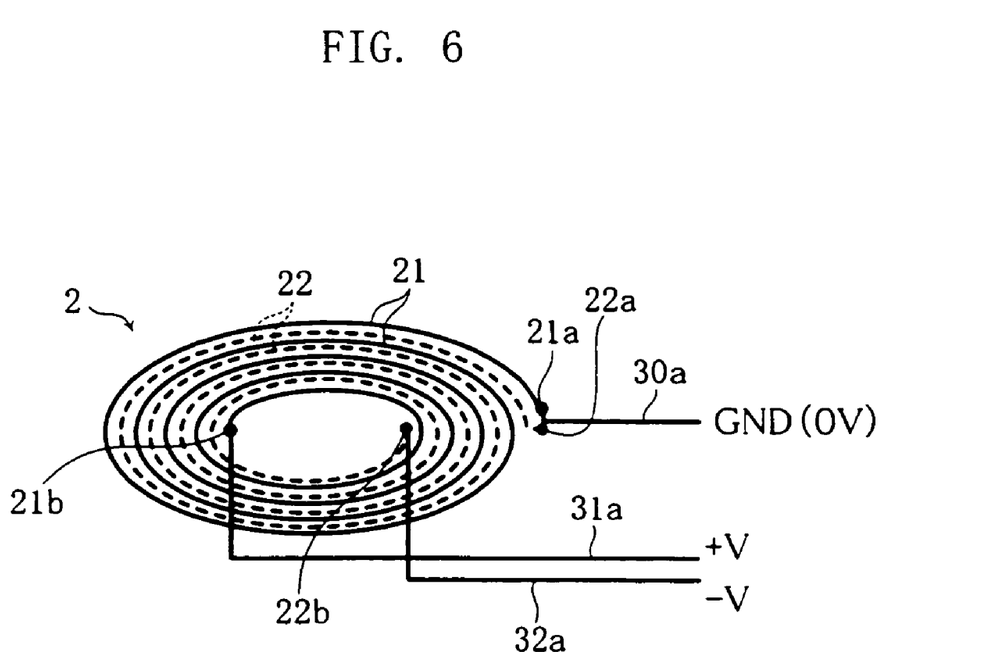
FIG. 6 is a diagram of a thin-film coil in FIG. 5.

FIG. 5 and FIG. 6 show a second embodiment of the magnetic head according to the present invention. In these figures, components identical with or similar to those in the first embodiment are indicated with the same reference codes, and their description will not be repeated.

As shown in FIG. 5 and FIG. 6, a magnetic head H according to the second embodiment, differs from the first embodiment only in the wiring of a thin-film coil 2. Specifically, an outer circumferential end 21a of a first spiral coil 21 and an outer circumferential end 22a of a second spiral coil 22 both connect with a base end of an electrically conductive lead wire 30a and become one, while the lead wire 30a extends radially of the thin-film coil 2, and connects with a wiring member 30aa. On the other hand, an inner circumferential end 21b of the first spiral coil 21 and an inner circumferential end 22b of the second spiral coil 22 are insulated from each other by the dielectric layer 4. These inner circumferential ends 21b, 22b are connected individually with respective lead wires 31a, 32a which extend radially of the thin-film coil 2. The lead wires 31a, 32a are connected to wiring members 31aa, 32aa respectively. These wiring members 30aa-32aa leads to a coil driving circuit which is out of the view of the figure. The lead wires 31a, 32a connected to the respective inner circumferential ends 21b, 22b are formed separately from the magnetic film 3. The other lead wire 30a is always formed separately from the magnetic film 3.

As shown in FIG. 6, the outer circumferential end 21a of the first spiral coil 21 and the inner circumferential end 22a of the second spiral coil 22 are commonly connected, via the lead wire 30a, with a grounding terminal which has a reference potential of 0V. On the other hand, the inner circumferential end 21b of the first spiral coil 21 is supplied with a +V electric potential from the unillustrated coil driving circuit via the lead wire 31a and so on, so that there is a positive potential difference from the reference potential 0V. Also, the inner circumferential end 22b of the second spiral coil 22 is supplied with a −V electric potential from the unillustrated coil driving circuit via the lead wire 32a and so on, so that there is a negative potential difference from the reference potential 0V, with the absolute voltage value being the same as of the voltage of the +V. With this arrangement, in the present embodiment, the first spiral coil 21 generates a recording magnetic field which has a downward magnetic flux from the coil center region 2a toward the substrate 1, when energized with the +V voltage applied to the inner circumferential end 21b. On the contrary, the second spiral coil 22 generates a recording magnetic field which has a reverse magnetic flux direction as of the downward flux created by the first spiral coil 21, i.e. an upward magnetic flux from the coil center region 2a toward the disc D, when energized with the −V voltage applied to the inner circumferential end 22b. It should be noted here that the inner circumferential end 21b of the first spiral coil 21 may be supplied with the −V voltage while the inner circumferential end 22b of the second spiral coil 22 is supplied with the +V voltage. In this case, directions of the magnetic fluxes of the recording magnetic fields generated by the first and the second spiral coils 21, 22 are the opposite directions to those described above.

The coil driving circuit for driving the thin-film coil 2 has a similar construction to the construction according to the first embodiment exemplified in FIG. 4. Specifically, in the coil driving circuit according to the second embodiment, the outer circumferential ends 21a, 22a and the inner circumferential ends 21b, 22b of the first and the second spiral coils 21, 22 are simply swapped, and the direction of magnetic flux in the first and the second spiral coils 21, 22 are reversed.

Therefore, the magnetic head H according to the second embodiment is also able to generate a recording magnetic field stably while the direction of magnetic flux with respect to the disc D is alternated at a high speed, with a simple physical construction in the thin-film coil 2 as well as a simple electrical construction in the coil driving circuit. Further, the coil driving circuit can drive the thin-film coil 2 appropriately, without using high frequency signals in a relatively high frequency range, which enables to reduce power consumption by the coil driving circuit.

Figure 7:
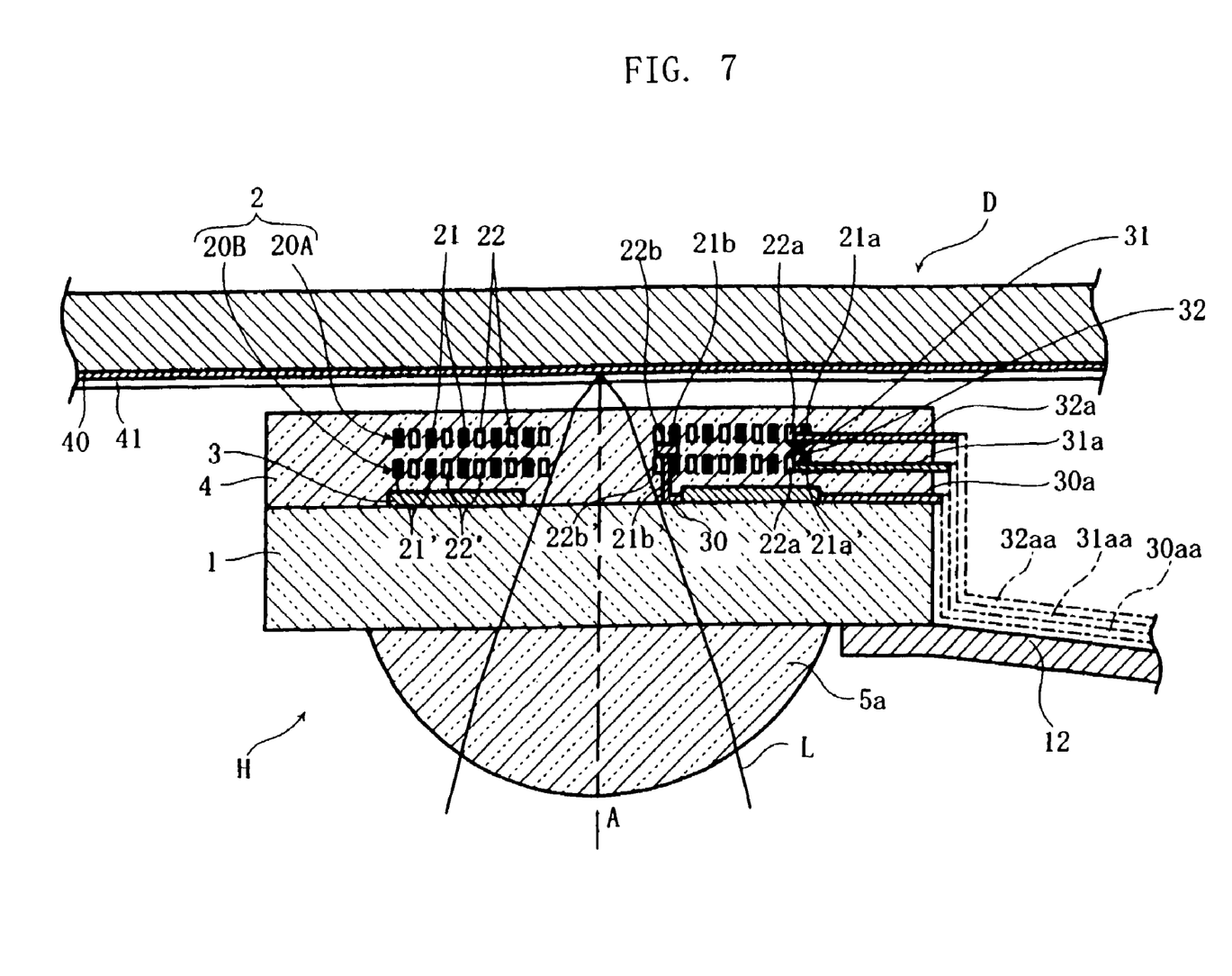
FIG. 7 is a sectional view showing a primary portion of a magnetic head as a third embodiment of the present invention.
Figure 8:
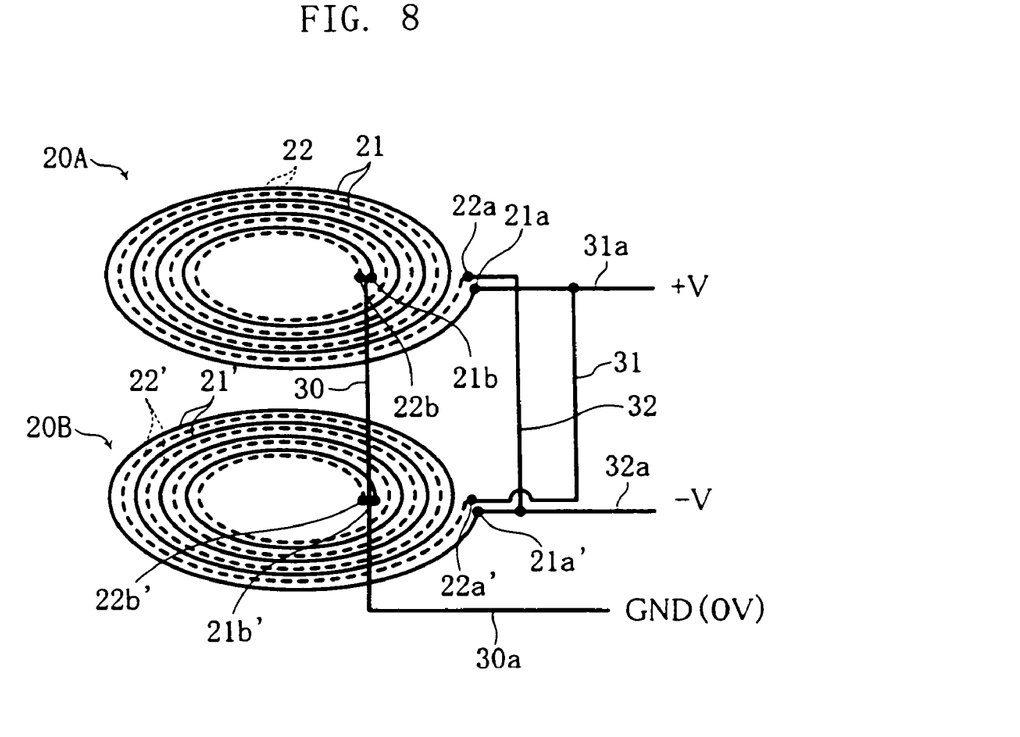
FIG. 8 is a diagram of a thin-film coil in FIG. 7.
Figure 9:
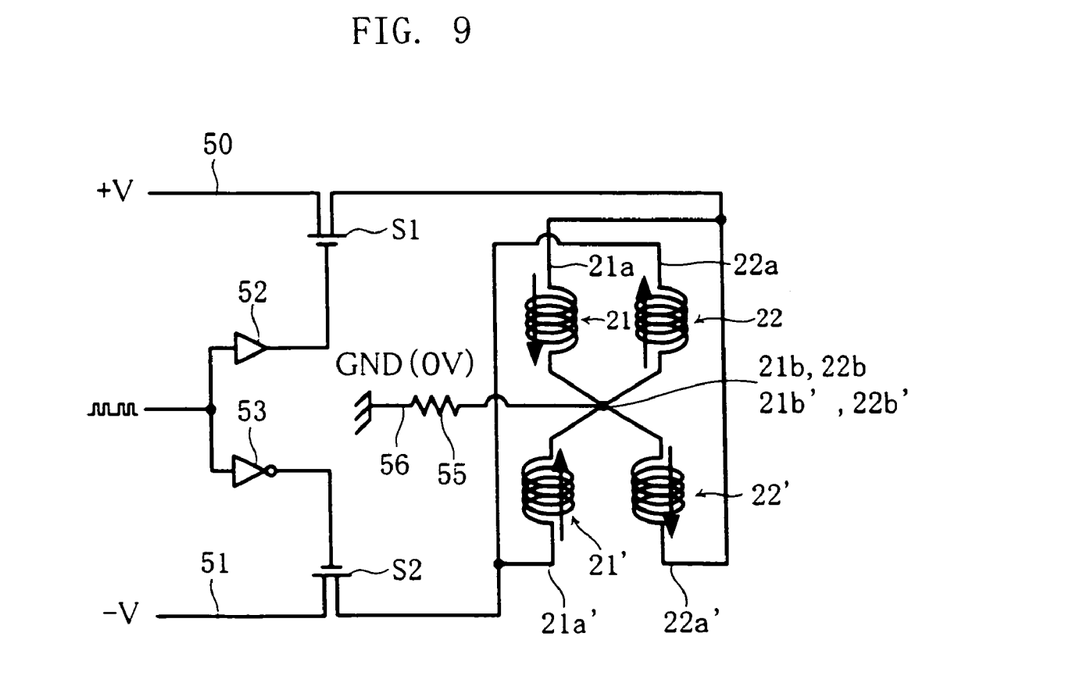
FIG. 9 shows an equivalent circuit to a coil driving circuit for the thin-film coil in FIG. 7.

FIGS. 7-9 show a third embodiment of the magnetic head according to the present invention. Again in these figures, components identical with or similar to those in the first embodiment are indicated with the same reference codes, and their description will not be repeated.

As shown in FIG. 7 and FIG. 8, in a magnetic head H according to the third embodiment, a thin-film coil 2 is made to form two layers, i.e. a first layer 20A and a second layer 20B in the dielectric layer 4. The first layer 20A is a layer closer to the disc D. In the first layer 20A, a first and a second spiral coils 21, 22 are formed as insulated from each other, in so called bifilar winding in that both coils are wound in the same direction (See FIG. 8). The second layer 20B is a layer between the first layer 20A and a magnetic film 3. In the second layer 20B, again, a first and the second spiral coils 21', 22' are formed as insulated from each other, in so called bifilar winding in that both coils are wound in the same direction (See FIG. 8). These first and the second spiral coils 21, 21', 22, 22' are formed identically with each other, in terms of the number of windings, the length as well as the direction of windings.

An outer circumferential end 21a of the first spiral coil 21 in the first layer 20A and an outer circumferential end 22a' of the second spiral coil 22' in the second layer 20B are connected to each other via an electrically conductive junction 31. The outer circumferential ends 21a, 22a' thus become a connected pair in the first layer 20A and the second layer 20B and are commonly connected to a lead wire 31a which extends radially of the thin-film coil 2. The lead wire 31a is connected to a wiring member 31aa which extends out of the substrate 1. The wiring member 31aa leads to a coil driving circuit which is out of the scope of the figure. Likewise, an outer circumferential end 22a of the second spiral coil 22 in the first layer 20A and an outer circumferential end 21a' of the first spiral coil 21' in the second layer 20B are connected to each other via an electrically conductive junction 32. The outer circumferential ends 22a, 21a' thus become a connected pair in the first layer 20A and the second layer 20B and are commonly connected to a lead wire 32a which extends radially of the thin-film coil 2. The lead wire 32a is connected to a wiring member 32aa which extends out of the substrate 1. The wiring member 32aa also leads to the coil driving circuit which is out of the scope of the figure. On the other hand, inner circumferential ends 21b, 22b of the first and the second spiral coils 21, 22 in the first layer 20A and the inner circumferential ends 21b', 22b' of the first and the second spiral coils 21', 22' in the second layer 20B are connected collectively with an electrically conductive junction 30. The junction 30 is connected to a lead wire 30a which extends radially of the thin-film coil 2. The lead wire 30a connected to the junction 30 leads to a wiring member 30aa which extends out of the substrate 1. The wiring member 30aa leads to the coil driving circuit which is out of the scope of the figure. The lead wire 30a connected to the junction 30 may be formed separately from the magnetic film 3 within the same layer, or may be integral with the magnetic film 3 within the same layer. However, the other lead wires 31a, 32a are always formed separately from the magnetic film 3.

As shown in FIG. 8, all of the inner circumferential ends 21b, 22b, 21b', 22b in the first layer 20A and the second layer 20B are commonly connected, via the junction 30, the lead wire 30a and so on, with a grounding terminal which has a reference potential of 0V. On the other hand, the outer circumferential ends 21a, 22a' of the spiral coils 21, 22' in the first layer 20A and the second layer 20B are supplied with a +V electric potential from the unillustrated coil driving circuit via the lead wire 31a and so on, so that there is a positive potential difference from the reference potential 0V. Also, the outer circumferential ends 22a, 21a' of the spiral coils 22, 21' in the first layer 20A and the second layer 20B is supplied with a −V electric potential from the unillustrated coil driving circuit via the lead wire 32a and so on, so that there is a negative potential difference from the reference potential 0V, with the absolute voltage vale being the same as of the voltage of the above +V. In other words, the spiral coils 21, 22' in the first layer 20A and the second layer 20B are electrically connected in parallel to each other. Further, the spiral coils 22, 21' in the first layer 20A and the second layer 20B are also electrically connected in parallel to each other. A circuit including the pair of spiral coils 21, 22' and a circuit including the pair of spiral coils 22, 21' are electrically separated from each other. With this arrangement, in the present embodiment, the spiral coils 21, 22' in the first layer 20A and the second layer 20B simultaneously generate recording magnetic fields which, for example, have a downward magnetic flux from a coil center region 2a toward the substrate 1, when energized with the +V voltage applied to the outer circumferential ends 21a, 22a'. On the contrary, the spiral coils 22, 21' in the first layer 20A and the second layer 20B simultaneously generate recording magnetic fields which have a reverse magnetic flux direction as of the downward flux created by the above-described spiral coils 21, 22', i.e. recording magnetic fields which have an upward magnetic flux from the coil center region 2a toward the disc D, when energized with the −V voltage applied to the outer circumferential ends 22*a*, 21*a*'. It should be noted here that the outer circumferential ends 21*a*, 22*a*' of the spiral coils 21, 22' may be supplied with the −V voltage while the outer circumferential ends 22*a*, 21*a*' of the spiral coils 22, 21' are supplied with the +V voltage. In this case, the direction of magnetic flux in the recording magnetic fields which are generated simultaneously by the spiral coils 21, 22' and the direction of magnetic flux in the recording magnetic fields which are generated simultaneously by the spiral coils 22, 21' are opposite to those described above.

The coil driving circuit for driving the thin-film coil 2 has a construction as exemplified in FIG. 9. As shown in FIG. 9, in the coil driving circuit, the outer circumferential ends 21*a*, 22*a*' of the spiral coils 21, 22' are commonly connected to a power input terminal 50 of the +V via a switching transistor S1 while the outer circumferential ends 22*a*, 21*a*' of the spiral coils 22, 21' are commonly connected to a power input terminal 51 of the −V via a switching transistor S2. All of the inner circumferential ends 21*b*, 22*b*, 21*b*', 22*b*' are commonly connected to a grounding terminal 56 of the reference potential 0V, via an electric resister 55. The switching transistor S1 is supplied with a digital signal which represents the data to be recorded, via an amplifying device 52 which outputs signals of the same phase as of the input. Responding to the H/L levels of the digital signal, the switching transistor S1 is turned on and off. On the other hand, the switching transistor S2 is supplied with the digital signal which represents the data to be recorded, via a reverse amplifying device 53 which outputs signals of the reversed phase of the input. Responding to the H/L levels of this digital signal, the switching transistor S2 is turned on and off. In other words, the coil driving circuit switches the state of energization of the spiral coils 21, 22' and of the spiral coils 22, 21' exclusively to each other and at a high speed, based on a digital signal which represents data to be recorded.

When the thin-film coil 2 is driven by such a coil driving circuit as the above, the recording magnetic fields which are generated simultaneously by the spiral coils 21, 22' in the same direction of magnetic flux and the recording magnetic fields which are generated simultaneously by the spiral coils 22, 21' in the same direction of magnetic flux have the same level of intensity although the direction of magnetic fluxes are opposite to each other. This is because all of the spiral coils 21, 21', 22, 22' are identical with each other in terms of the number of windings and the length, and in addition, the pair of spiral coils 21, 22' and the pair of spiral coils 22, 21' are supplied with an identical level of voltage although the voltage polarity is different. Another reason is that the first layer 20A and the second layer 20B generate recording magnetic fields simultaneously. Therefore, the magnetic head H according to the third embodiment is able to generate a recording magnetic field stably while the direction of magnetic flux with respect to the disc D is alternated at a high speed, with a simple physical construction in the thin-film coil 2 as well as a simple electrical construction in the coil driving circuit.

Figure 10:
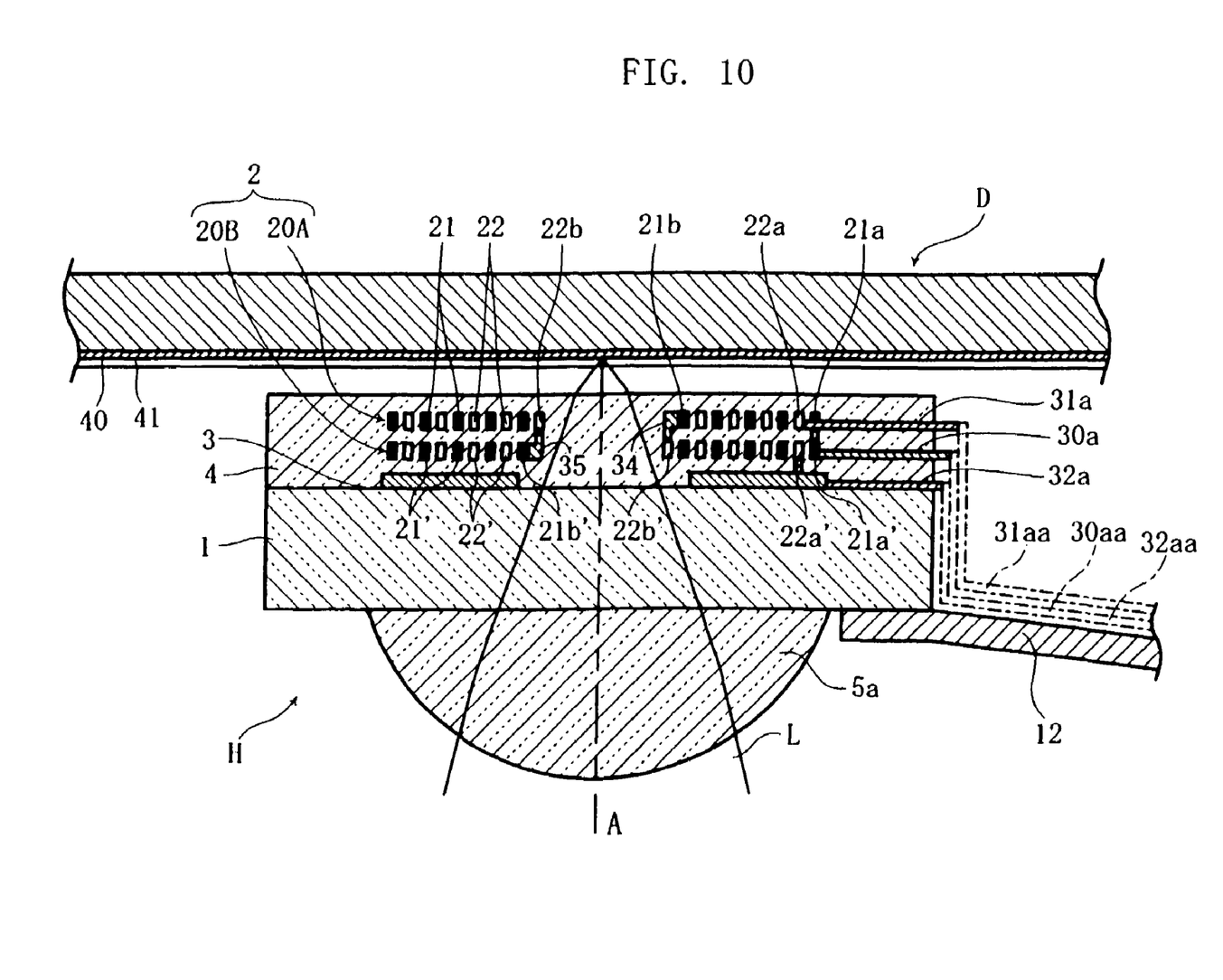
FIG. 10 is a sectional view showing a primary portion of a magnetic head as a fourth embodiment of the present invention.
Figure 11:
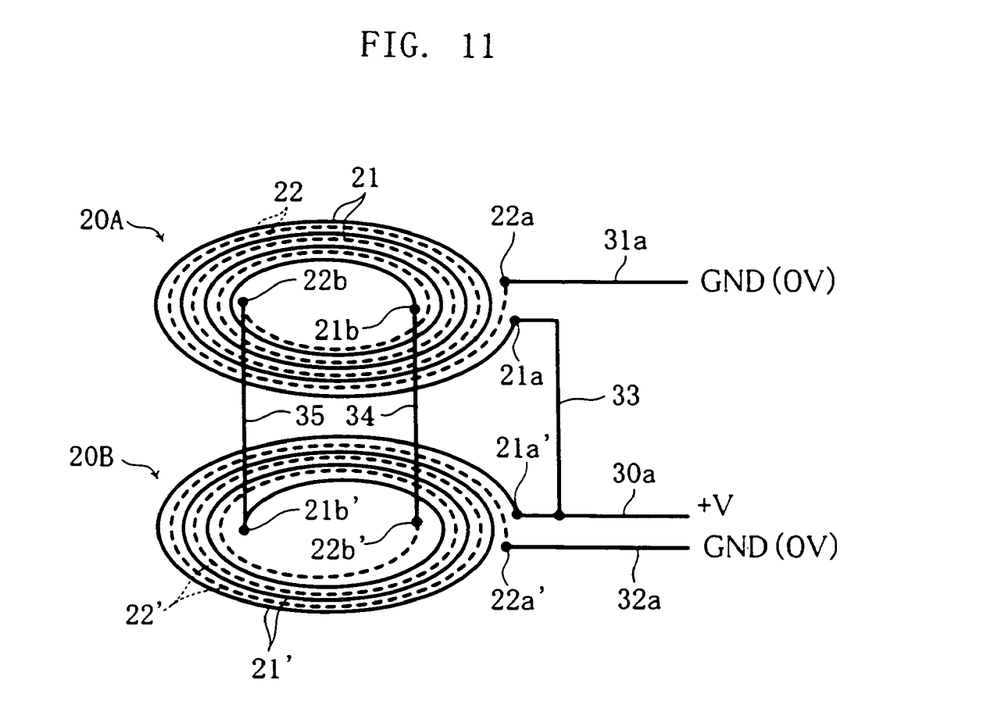
FIG. 11 is a diagram of a thin-film coil in FIG. 10.
Figure 12:
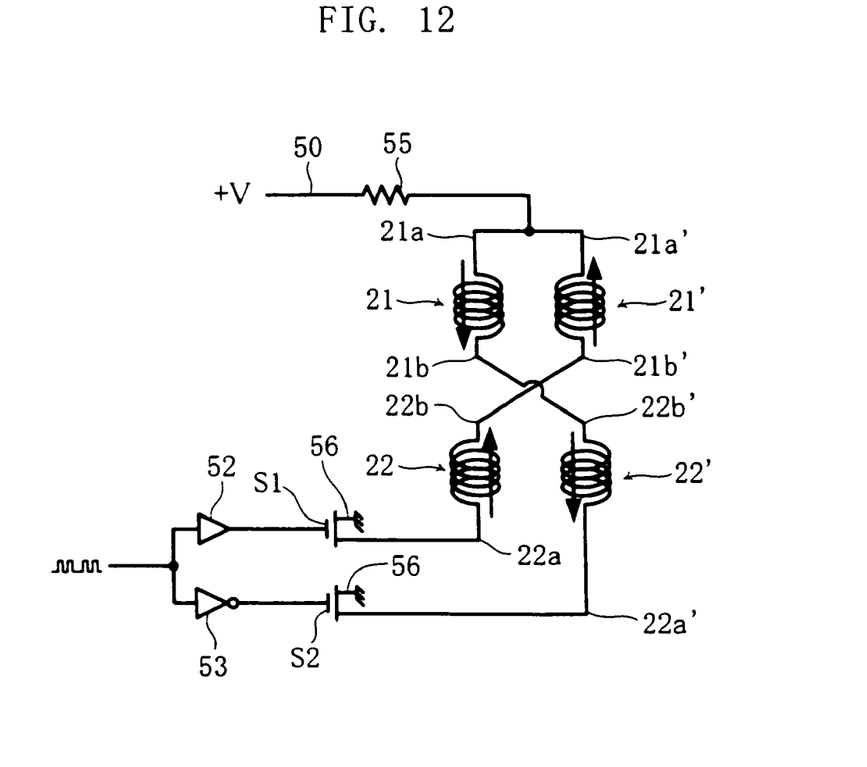
FIG. 12 shows an equivalent circuit to a coil driving circuit for the thin-film coil in FIG. 10.

FIGS. 10-12 show a fourth embodiment of the magnetic head according to the present invention. In these figures, components identical with or similar to those in the first and the third embodiments are indicated with the same reference codes as in the third embodiment, and their description will not be repeated.

As shown in FIG. 10 and FIG. 11, in a magnetic head H according to the fourth embodiment, an outer circumferential end 21*a* of a first spiral coil 21 in a first layer 20A and an outer circumferential end 21*a*' of a first spiral coil 21' in a second layer 20B are connected to each other via an electrically conductive junction 33. The outer circumferential ends 21*a*, 21*a*' thus become a connected pair in the first layer 20A and the second layer 20B and are connected to a lead wire 30*a* which extends radially of the thin-film coil 2. An outer circumferential end 22*a* of the second spiral coil 22 in the first layer 20A is connected directly with a lead wire 31*a* which extends radially of the thin-film coil 2. Also, an outer circumferential end 22*a*' of a second spiral coil 22' in the second layer 20B is connected directly with a lead wire 32*a* which extends radially of the thin-film coil 2. On the other hand, an inner circumferential end 21*b* of the first spiral coil 21 in the first layer 20A is connected to an inner circumferential end 22*b*' of the second spiral coil 22' in the second layer 20B via a conductive junction 34. The junction 34 is not connected to a lead wire. Further, an inner circumferential end 22*b* of the second spiral coil 22 in the first layer 20A is connected to an inner circumferential end 21*b*' of the first spiral coil 21' in the second layer 20B via a conductive junction 35. The junction 35 is not connected to a lead wire, either. It should be note here that as shown in FIG. 11, the coil winding direction in the first layer 20A and the coil winding direction in the second layer 20B are opposite to each other.

As shown in FIG. 11, the outer circumferential ends 21*a*, 21*a*' of the spiral coils 21, 21' in the first layer 20A and the second layer 20B are commonly connected to a positive terminal which gives a +V potential difference from a reference potential of 0V. On the other hand, the outer circumferential end 22*a* of the spiral coil 22 in the first layer 20A is supplied with a reference 0V electric potential via the lead wire 31*a* and so on. Also, the outer circumferential end 22*a*' of the second spiral coil 22' in the second layer 20B is supplied with the reference 0V electric potential via the lead wire 32*a* and so on. In other words, the second spiral coils 22' in the first layer 20A and the first spiral coil 21' in the second layer 20B are electrically connected in series via the junction 35. Further, the second spiral coil 22' in the second layer 20B and the first spiral coils 21 in the first layer 20A are also electrically connected in series via the junction 34. A circuit including the pair of the second spiral coil 22 and the first spiral coil 21' and a circuit including the pair of second spiral coil 22' and the first spiral coil 21 are electrically separated from each other. With this arrangement, in the present embodiment, the second spiral coil 22 in the first layer 20A and the first spiral coil 21' in the second layer 20B simultaneously generate recording magnetic fields which, for example, have an upward magnetic flux from the coil center region 2*a* toward the disc D, when the outer circumferential end 22*a* of the second spiral coil 22 in the first layer 20A is grounded. On the contrary, the first spiral coil 21 in the first layer 20A and the second spiral coil 22' in the second layer 20B simultaneously generate recording magnetic fields which have a reverse magnetic flux direction as of the upward flux, i.e. recording magnetic fields which have a downward magnetic flux from the coil center region 2*a* toward the substrate 1, when the outer circumferential end 22*a*' of the second spiral coil 22' in the second layer 20B is grounded.

The coil driving circuit for driving the thin-film coil 2 has a construction as exemplified in FIG. 12. As shown in FIG. 12, in the coil driving circuit, the outer circumferential ends 22*a* of the second spiral coil 22 in the first layer 20A is connected to a grounding terminal 56 via a switching transistor S1 while the outer circumferential end 22*a*' of the second spiral coil 22' in the second layer 20B is connected to a ground terminal 56 via a switching transistor S2. The outer circumferential ends 21a, 21a' of the first spiral coils 21, 22 in the first layer 20A and the second layer 20B are commonly connected to a power input terminal 50 of the +V via an electric resister 55. The inner circumferential end 21b of the first spiral coil 21 in the first layer 20A is connected directly with an inner circumferential end 22b' of the second spiral coil 22' in the second layer 20B. Also, the inner circumferential end 22b of the second spiral coil 22 in the first layer 20B is connected directly with the inner circumferential end 21b' of the first spiral coil 21' in the second layer 20B. The switching transistor S1 is supplied with a digital signal which represents the data to be recorded, via an amplifying device 52 which outputs signals of the same phase as of the input. Responding to the H/L levels of the digital signal, the switching transistor S1 is turned on and off. On the other hand, the switching transistor S2 is supplied with the digital signal which represents the data to be recorded, via a reverse amplifying device 53 which outputs signals of the reversed phase of the input. Responding to the H/L levels of this digital signal, the switching transistor S2 is turned on and off. In other words, the coil driving circuit switches the state of energization of the first spiral coil 21 and the second spiral coil 22' and of the second spiral coil 22 and the first spiral coil 21' exclusively to each other and at a high speed, based on a digital signal which represents data to be recorded.

When the thin-film coil 2 is driven by such a coil driving circuit as the above, the recording magnetic fields generated simultaneously by the pair of first spiral coil 21 and the second spiral coil 22' in the same direction of magnetic flux and the recording magnetic fields generated simultaneously by the pair of second spiral coil 22 and first spiral coil 21' in the same direction of magnetic flux have the same level of intensity, with the directions of magnetic fluxes being opposite from each other. This is because all of the spiral coils 21, 21', 22, 22' are identical with each other in terms of the number of windings and the length, and in addition, the pair of first spiral coil 21 and second spiral coil 22' and the pair of second spiral coil and first spiral coil 21' are supplied with an identical level of voltage although the voltage polarity is different. Another reason is that the first layer 20A and the second layer 20B generate recording magnetic fields simultaneously. Therefore, the magnetic head H according to the fourth embodiment is also able to generate a recording magnetic field stably while the direction of magnetic flux with respect to the disc D is alternated at a high speed, a simple physical construction in the thin-film coil 2 as well as a simple electrical construction in the coil driving circuit.

The invention claimed is:

1. A thin-film coil comprising a first and a second spiral coils of bifilar winding formed in a predetermined layer on a substrate, each of the first and the second spiral coils including an outer circumferential end and an inner circumferential end,
   wherein the outer circumferential end of the first spiral coil and the outer circumferential end of the second spiral coil are insulated from each other and extended individually to a side of the substrate, and wherein the inner circumferential end of the first spiral coil and the inner circumferential end of the second spiral coil are connected to each other and extended to a side of the substrate via a layer different from the predetermined layer.

2. A thin-film coil comprising a first and a second spiral coils of bifilar winding formed in a predetermined layer on a substrate, each of the first and the second spiral coils including an outer circumferential end and an inner circumferential end,
   wherein the outer circumferential end of the first spiral coil and the outer circumferential end of the second spiral coil are connected to each other and extended to a side of the substrate, and wherein the inner circumferential end of the first spiral coil and the inner circumferential end of the second spiral coil are insulated from each other and extended individually to a side of the substrate via a layer different from the predetermined layer.

3. A thin-film coil comprising a first and a second layers on a substrate, each of the first and the second layers comprising a first and a second spiral coils of bifilar winding, each of the first and the second spiral coils in each layer including an outer circumferential end and an inner circumferential end,
   wherein a coil winding direction of the first and the second spiral coils in the first layer and a coil winding direction of the first and the second spiral coils in the second layer are identical to each other,
   the outer circumferential end of selected one of the first and the second spiral coils in the first layer being connected to the outer circumferential end of selected one of the first and the second spiral coils in the second layer, the outer circumferential end of nonselected one of the first and the second spiral coils in the first layer being connected to the outer circumferential end of nonselected one of the first and the second spiral coils in the second layer, each of the connected pairs of the outer circumferential ends being individually extended to a side of the substrate,
   the inner circumferential ends of the first and the second spiral coils in the first layer being connected to each other and collectively connected to the inner circumferential ends of the first and the second spiral coils in the second layer, the inner circumferential ends of the spiral coils in the first layer and the second layer thus integrated by the collective connection being extended to a side of the substrate via a layer different from the first and the second layers.

4. A thin-film coil comprising a first and a second layers on a substrate, each of the first and the second layers comprising a first and a second spiral coils of bifilar winding, each of the first and the second spiral coils in each layer including an outer circumferential end and an inner circumferential end,
   wherein a coil winding direction of the first and the second spiral coils in the first layer and a coil winding direction of the first and the second spiral coils in the second layer are opposite to each other,
   the outer circumferential end of selected one of the first and the second spiral coils in the first layer being connected to the outer circumferential end of selected one of the first and the second spiral coils in the second layer, the outer circumferential ends of the spiral coils in the first layer and the second layer thus formed into a connected pair being extended to a side of the substrate, the outer circumstantial ends of nonelected spiral coils in the first layer and the second layer being extended individually to a side of the substrate,
   the inner circumferential end of selected one of the first and the second spiral coils in the first layer being connected to the inner circumferential end of selected one of the first and the second spiral coils in the second layer.

5. A coil driving circuit for driving the thin-film coil according to claim 1,
wherein the circuit constantly keeps the inner circumferential end of the first spiral coil and the inner circumferential end of the second spiral coil at a predetermined reference potential,
the circuit energizing one of the outer circumferential ends of the first spiral coil and the second spiral coil to a positive electric potential relative to the reference potential, while energizing the other outer circumferential end to a negative electric potential relative to the reference potential, the circuit being designed to switch these states of energization exclusively to each other.

6. A coil driving circuit for driving the thin-film coil according to claim 2,
wherein the circuit constantly keeps the outer circumferential end of the first spiral coil and the outer circumferential end of the second spiral coil at a predetermined reference potential,
the circuit energizing one of the inner circumferential ends of the first spiral coil and the second spiral coil to a positive electric potential relative to the reference potential, while energizing the other inner circumferential end to a negative electric potential relative to the reference potential, the circuit being designed to switch these states of energization exclusively to each other.

7. A coil driving circuit for driving the thin-film coil according to claim 3,
wherein the circuit constantly keeps the inner circumferential ends of the first and the second spiral coils in the first layer as well as the inner circumferential ends of the first and the second spiral coils in the second layer at a predetermined reference potential,
the circuit energizing one of the connected pairs of the outer circumferential ends of the spiral coils in the first layer and the second layer to a positive electric potential relative to the reference potential, while energizing the other pair to a negative electric potential relative to the reference potential, the circuit being designed to switch these states of energization exclusively to each other.

8. A coil driving circuit for driving the thin-film coil according to claim 4,
wherein the circuit constantly keeps the connected pair of the outer circumferential ends of the spiral coils in the first and the second layers at a predetermined reference potential,
the circuit energizing all of the other outer circumferential ends of the spiral coils in the first layer and the second layer to a predetermined level of electric potential relative to the reference potential, the circuit being designed to switch these states of energization exclusively to each other.

9. A magnetic head comprising the thin-film coil according to claim 1.

10. A magnetic head comprising the thin-film coil according to claim 2.

11. A magnetic head comprising the thin-film coil according to claim 3.

12. A magnetic head comprising the thin-film coil according to claim 4.

* * * * *